Patented Apr. 27, 1943

2,317,694

UNITED STATES PATENT OFFICE 2,317,694

PARAFFIN ALKYLATION PROCESS

Clarence J. Ott, San Francisco, Calif., assignor to Shell Development Company, San Francisco, Calif., a corporation of Delaware No Drawing. Application September 27, 1941, Serial No. 412,681

8 Claims. (Cl. 196—10)

This invention relates to the alkylation of saturated hydrocarbons, particularly open and closed chain paraffins preferably having a tertiary carbon atom. It deals with an improved method for carrying out such reactions by means of new and more advantageous alkylating agents.

The alkylation of isoparaffins such as isobutane, isopentane and the like by reaction with olefines, particularly normally gaseous olefines, is carried out on a large scale. Concentrated sulfuric acid is the most generally used catalyst but other alkylation catalysts such as aluminum chloride, hydrogen fluoride, boron trifluoride, halosulfonic acids such as chloro and fluorosulphonic acids, hydrofluoroboric acid, etc., have also been used. It is an object of the present invention to provide an improved method for carrying out such reactions by means of new alkylating agents which offer advantages over the previously used olefines.

According to the invention the alkylation of open and closed chain paraffins is effected by reacting such paraffins, in the presence of an alkylation catalyst, with esters of organic acids having dissociation constants greater than $2 \times 10^{-5}$ and most preferably greater than $5 \times 10^{-5}$. By this method of operation, the difficulties and undesirable features involved in the use of olefines as alkylating agents are avoided.

While the exact mechanism of the reaction involved has not been fully determined, the results obtained with esters of alcohols having at least two carbon atoms per molecule can be explained by assuming that in the presence of an alkylatable saturated hydrocarbon and an alkylation catalyst such esters of strong organic acids such as formic, oxalic, trichloracetic and the like undergo scission with formation of free organic acid and an olefine. The latter immediately reacts with the saturated hydrocarbon so that the concentration of olefine in the reaction mixture is kept very low at all times and there is much less tendency for the catalyst to be deactivated by side reactions than is the case when olefines are used as alkylating agents. Whatever may be the true explanation of the changes taking place, the use of esters of organic acids having dissociation constants greater than $2 \times 10^{-5}$ is capable of giving greatly improved results not only with respect to the life of the alkylation catalyst used but also in regard to the yield and quality of product obtained.

The process of the invention may be applied to the alkylation of open or closed chain aliphatic hydrocarbons, particularly those containing a hydrogen atom attached to a tertiary carbon atom and suitable substitution products thereof, although by the use of alkylation catalysts which are capable of isomerizing normal paraffins under the reaction conditions, for example aluminum chloride, such paraffins may be alkylated by the new procedure. Thus, it may be used for the manufacture of other branched chain compounds from isobutane, isopentane, 2-methyl pentane, 2,3-dimethyl butane, 2,2,5-trimethyl hexane, 3-ethyl pentane, methyl cyclopentane, methyl cyclohexane, 1,4-dimethyl cyclohexane, 1-chloro-3-methyl butane and the like, or from the corresponding unbranched compounds. Such saturated starting materials may be used in a pure state or as a mixture of two or more such compounds or mixtures containing such a compound with other components which may or may not be inert under the reaction conditions but which do not inhibit the desired alkylation. Particularly advantageous sources of starting material for the process of the invention are hydrocarbons which may be derived from petroleum, petroleum products, shale oil, coal or other carboniferous materials. The straight and/or branched chain alkylatable saturated compounds present in the starting material may be of natural occurrence, the result of pyrogenetic treatment, hydrogenation, isomerization or other suitable processing. Cracked petroleum distillates or special fractions thereof, particularly hydrocarbon fractions consisting of or predominating in hydrocarbons containing the same number of carbon atoms per molecule may be used although non-isomeric mixtures such as gasoline fractions are also suitable. Such fractions or mixtures may advantageously be subjected to suitable refining for the removal of sulfur and/or nitrogen or oxygen compounds or other undesirable impurities prior to use in the process of the invention. Removal of the more reactive hydrocarbons such as aromatic and/or unsaturated hydrocarbons may also be desirable. Thus, the extraction process of United States Patent 2,114,524, for example, may be used to decrease the aromatic content of the material to be alkylated and/or olefines may be removed by extraction as described in Patents 1,893,733, 2,007,159 and 2,060,143 or by polymerization as shown in Patents 2,007,160, 2,142,980 and 2,174,247. Whether or not one or more such pretreatments of the feed stock is applied, it may be advantageous to further increase the concentration of the saturated aliphatic compound being reacted by fractionation and/or isomerization of isomeric hydrocarbons present therewith.

For the purpose of making the invention more clear it will be described in detail in connection with the use of concentrated sulfuric acid, preferably acid of 90%–100% concentration, as the alkylation catalyst since its low first cost and ready availability make this a particularly advantageous catalyst. It will be understood, however, that the invention is not limited thereto as similar, or in some cases even relatively greater, advantages may be obtained when the process is applied to alkylations carried out with other acid alkylation catalysts such as hydrogen fluoride, chlorosulfonic, fluorosulfonic, bromosulfonic, and hydrofluoroboric acids. Furthermore, not only may mixtures of such catalyst acids be used, but also mixtures of one or more acid alkylation catalysts with other materials having a beneficial effect on the reaction, such for example as boron fluoride, copper and/or magnesium sulfates, the oxides of elements of group V of the periodic table, e. g. phosphorus pentoxide, an oxide of vanadium, etc., zinc or cadmium phosphates, sulfur dioxide and/or trioxide, or other suitable compounds. Instead of acid catalysts alkylation catalysts of the Friedel-Crafts type such as aluminum halides or organic or inorganic complexes thereof, zinc chloride and the like may also be used.

A wide variety of esters of organic acids stronger than acetic acid may be used in the new paraffin alkylation process. Thus, esters of open or closed chain primary, secondary or tertiary alcohols may be employed. The acids from which the esters are prepared may be mono- or poly-basic and may or may not be substituted. It is preferred to use esters which are not readily alkylated under the reaction conditions, and most preferably esters of aliphatic carboxylic acids are used, although esters having substituted aromatic groups which sufficiently inhibit side reactions of the aromatic group may be employed. Most preferably esters of carboxylic acids at least as strong as formic acid are employed. Suitable esters are, for example, the methyl, ethyl, normal- and isopropyl, normal, secondary, tertiary and isobutyl, the amyl, hexyl and higher esters of formic, malic, citric, tartaric, malonic, oxalic, trimethyl sulfanilic, the haloacetic and halo-propionic acids, and the like. These preferred types of esters are cited by way of illustration only and it is to be understood that other esters of analogous strong organic acids, for example substitution products of the foregoing esters such as the corresponding halogenated esters or the like may also be used and substituted alkylation products, such for example as halogenated alkylation products, obtained therefrom. The expression "alkylating" as used hereinafter generically will be understood as including the introduction into paraffin molecules of either substituted or unsubstituted alkyl groups.

While the invention is not restricted with respect to the origin of the esters of strong organic acids used for alkylating the chosen paraffin, a particularly advantageous source of suitable esters is reaction of olefines with strong carboxylic acids in the presence of a suitable alkylation acid catalyst such as sulfuric or hydrofluoric acid or the like. An especially useful method of carrying out such reactions is described, for example, in United States Patent 2,006,734. Whether or not the olefines are esterified and the product recovered without dilution of the reaction mixture as therein described, it is feasible to use the entire upper layer of the esterification mixture as feed to the alkylation system. In this way any unesterified olefines may be recovered and used for alkylation along with the esters. Any undesirable constituents, for example diluent paraffins, present may be removed from the upper layer of the esterification mixture before it is used in the alkylation step of the process. Where different catalysts are used for the esterification and alkylation steps it may be advantageous to separate the esterification catalyst acid from the esters, as by the procedure claimed in United States Patent 2,042,218, prior to their use as alkylation agents. The acid catalyst used for the esterification may be advantageously acid which has been employed in the alkylation step of the process.

The temperature at which the reaction of the chosen ester and paraffin is most advantageously carried out will depend upon the nature of these reactants as well as upon the type of catalyst adopted and its concentration. With sulfuric acid of about 85% to 100% concentration, temperatures of the order of about 0° C. to 49° C. may be used, the lower temperatures being preferably employed with the more concentrated acid and the temperature being increased as the acid concentration is reduced. Similar temperatures may be employed in the presence of aluminum chloride and the like. With halosulfonic acid catalysts lower temperatures are generally preferable. Using a mixture of equal molecular amounts of boron fluoride and water as the catalyst, it is feasible to employ somewhat higher temperatures and even higher temperatures are desirable when employing less active catalysts.

The process may be carried out with both reactants in the vapor phase but more preferably at least the paraffin to be alkylated is maintained in the liquid phase. The preferred procedure is to maintain all reactants in the liquid state throughout the reaction. It is desirable to have a relatively large amount of liquid catalyst acid present, for example about 0.5 to 2 volumes, or preferably 0.7 to 1.3 volumes, of catalyst acid per volume of reaction mixture comprising the compound being alkylated and the ester alkylation agent, but lower proportions are feasible when using halosulfonic acids or aluminum chloride and the like as alkylation catalyst. The use of superatmospheric pressures is generally advantageous, but normal or reduced pressures may also be used.

The reaction time should be adjusted with relation to the reactivities of the ester or esters and catalyst involved so as to insure the desired amount of conversion. In the presence of concentrated sulfuric acid quite short times of contact, for example of the order of about 5 to 30 minutes, may be adequate for reaction of highly reactive esters of tertiary alcohols and strong organic acids, although longer times are usually not detrimental and in some cases may be advantageous. With esters of secondary alcohols contact times of about 10 to 90 minutes are preferred while still longer contact is usually desirable to insure adequate reaction of less reactive esters. It is preferred to use highly reactive alkylation catalysts, such as aluminum chloride and aluminum bromide and the like, for alkylation of paraffins with esters of primary alcohols, particularly methyl and ethyl esters. In alkylating with esters of secondary and tertiary alcohols which are more subject to undesirable side reactions, it is preferable to use milder alkylation catalysts such as sulfuric acid and aluminum chloride complexes, etc.

An excess of the open or closed chain paraffin being alkylated is desirable throughout the reaction. Smaller excesses may be used where less reactive organic acid esters are employed as the alkylating agent but with the more reactive tertiary and secondary esters of strong organic acids it is preferred to carry out the reaction with at least 1.5, more preferably at least 2, mols of the paraffin being alkylated per mol of alkylation agent and most preferably with higher ratios of the order of 10 to 100 to 1 or higher. Such high ratios may conveniently be achieved while employing more economical feed ratios of about 2.5 to 10 mols of isoparaffin per mol of ester by feeding the preferably premixed reactants into a stream of reaction mixture circulating in a closed circuit from which a part of the mixture is continuously withdrawn to a separator in which the bulk of the alkylation catalyst acid is withdrawn and returned to the circuit as described and claimed in United States Patent 2,232,674. Other methods of batch, intermittent, or continuous operation may be used.

In alkylating isobutane with normal propyl formate in the presence of 97% sulfuric acid, using a molar ratio of isobutane to propyl formate of about 80 to 1 in the reaction mixture and about equal volumes of catalyst and reactants at 25° C. and an average contact time of 40 minutes, isobutane alkylation products which are almost identical with those obtained by reaction with isopropyl formate under the same conditions are produced. In both cases saturated hydrocarbons boiling between about 50° C. and 145° C. are formed. From these an 85% yield of aviation gasoline fraction having an octane number of about 89 may be separated.

The normal and secondary butyl formates likewise give very similar isobutane alkylation products under the same conditions. The hydrocarbon products are substantially completely saturated and have a specific gravity of about 0.70. About 95% boil below 150° C. and have an octane number of 92. The corresponding products obtained by alkylation of isobutane with isobutyl and tertiary butyl formates are very similar but may have a slightly higher octane number.

In operations such as these the strong organic acid set free in the reaction, as well as any unreacted ester, appears for the most part in the hydrocarbon phase of the reacted mixture. These components may be readily separated, as by fractionation, from the reaction products and may then be used for the preparation of more ester. Alternatively, the mixture of alkylation products and free organic acid obtained in the alkylation may be used as feed to the esterification unit, preferably after removal of unreacted isoparaffin or other volatile components. This procedure is particularly advantageous when using esters of organic acids which boil at or near the boiling point of the desired alkylation products.

It will be apparent that the invention offers many advantages over prior methods of alkylating isoparaffins, naphthalenes, and the like and that it is capable of wide variations not only with respect to the open and closed chain paraffins which may be alkylated and the esters of strong organic acids which may be reacted therewith but also in regard to the method of operation which may be applied. For example, while alkylation of paraffins with esters of organic acids having a dissociation constant greater than $2 \times 10^{-5}$ has been emphasized, it is possible and sometimes very advantageous to carry out the alkylation with a mixture of one or more such esters with another alkylating agent. Thus, when esters produced by reaction of olefines with strong carboxylic acids are being employed it may be desirable to esterify only the more reactive tertiary olefine content of the olefinic mixture and to use as feed to the alkylation unit the tertiary esters and the unreacted secondary olefine. Such a procedure offers the advantage of providing longer alkylation catalyst life than if the tertiary olefines are used as alkylating agents along with the secondary olefines yet involves no less in yield of alkylate from removal of the tertiary olefines. Similar advantages may be obtained when the alkylation is carried out using the secondary olefines and tertiary esters of strong organic acids in different alkylation units. Furthermore, although alkylation with the entire ester content of an alkyl ester mixture has been described, this is by no means the only possible or always the most desirable method of operation since the differences in reactivities of the different esters may be utilized for selective alkylation with one or more components of such mixtures. Thus, the process of the invention may be used to separate esters of weaker organic acids from those of strong organic acid as well as for the removal of more reactive from less reactive esters of the same strong organic acid. Still other variations of the process may be carried out and it will therefore be understood that the invention is not limited to the details disclosed by way of illustration and example, nor by any theory suggested in explanation of the improved results obtained.

I claim as my invention:

1. A process of alkylating isobutane which comprises reacting isobutane with isopropyl formate in the presence of about 0.5 to 2 volumes of sulfuric acid of at least 85% concentration per volume of said reactants at a temperature between 0° C. and 40° C.

2. A process of alkylating an isoparaffin which comprises reacting said isoparaffin with an ester of formic acid and an aliphatic secondary alcohol in the presence of concentrated sulfuric acid.

3. A process of alkylating an isoparaffin which comprises reacting said isoparaffin with an ester of a carboxylic acid having a dissociation constant greater than $2 \times 10^{-5}$ and an aliphatic tertiary alcohol in the presence of concentrated sulfuric acid.

4. A process of alkylating an isoparaffin which comprises reacting said isoparaffin with an ester of an organic acid having a dissociation constant greater than $2 \times 10^{-5}$ and an aliphatic monohydric alcohol in the presence of an inorganic acid alkylation catalyst.

5. A process of alkylating a saturated aliphatic hydrocarbon having a tertiary carbon atom which comprises reacting said hydrocarbon with an aliphatic ester of an organic monobasic acid having a dissociation constant greater than $2 \times 10^{-5}$ in the presence of an alkylation catalyst.

6. A process of alkylating a saturated aliphatic hydrocarbon having a tertiary carbon atom which comprises reacting said hydrocarbon with an ester of an aliphatic monobasic carboxylic acid having a dissociation constant greater than $2\times10^{-5}$ and an olefine in the presence of an inorganic acid alkylation catalyst.

7. A process of alkylating a saturated aliphatic hydrocarbon which comprises reacting said hydrocarbon with an ester of an organic acid having a dissociation constant greater than $2\times10^{-5}$ in the presence of an alkylation catalyst.

8. A process of alkylating isobutane which comprises reacting isobutane with a mixture of a formic acid ester derived from a tertiary olefin and the corresponding secondary olefin in the presence of concentrated sulfuric acid, whereby alkylation of the isobutane by said olefin and ester is effected.

CLARENCE J. OTT.